United States Patent Office 3,371,109
Patented Feb. 27, 1968

3,371,109
CARBAMIC ACID ESTERS OF THIOBISPHENOLS
Joseph Willard Baker, Kirkwood, and Ignatius Schumacher, Webster Groves, Mo., assignors to Monsanto Company, St. Louis, Mo., a corporation of Delaware
No Drawing. Filed June 19, 1964, Ser. No. 376,574
9 Claims. (Cl. 260—471)

ABSTRACT OF THE DISCLOSURE

This disclosure covers certain carbamic acid esters of halogenated thiobisphenols. These esters have been found to be useful in the control of bacterial and fungal organisms.

---

This invention relates to a novel class of carbamic acid esters of thiobisphenols. More particularly, this invention is concerned with a class of new organic compounds wherein a 2,2' - thiobis(halophenol) is attached to one or two carbamic acid groups. Such materials have been found to possess useful and unexpected biological activity.

The novel compounds of this invention have the formula,

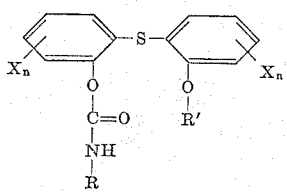

wherein R' is selected from the group consisting of hydrogen and

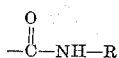

R is selected from the group consisting of lower alkyl, phenyl, chlorophenyl of from 1 to 3 chlorine atoms and bromophenyl of from 1 to 3 bromine atoms, X is selected from the class consisting of chlorine and bromine, and $n$ is an integer from 1 to 3. As employed herein, the term "lower alkyl" connotes those alkyl groups, either straight or branch chain, having up to 4 carbon atoms.

The carbamic acid esters of this invention can be prepared by reacting an alkyl, phenyl or halophenyl isocyanate with a 2,2' - thiobis(halophenol). Such a reaction is illustrated by the following equation, which represents the use of equimolar quantities of both reactants:

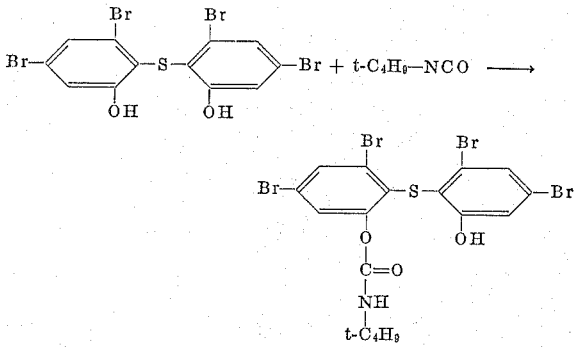

However, when the isocyanate and the thiobisphenol are employed in a molar ratio of about 2:1, the reaction is illustrated by the following equation:

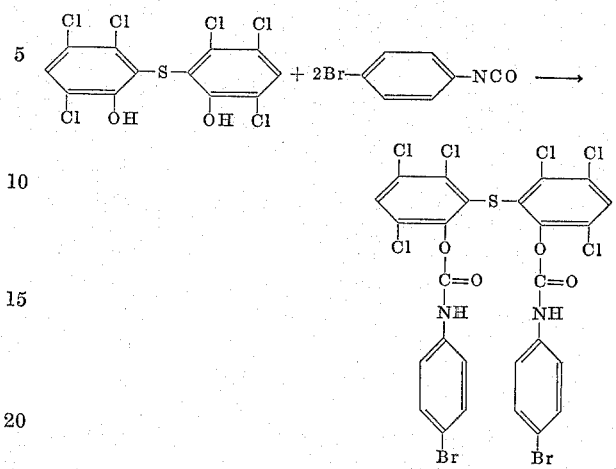

In practicing the preparations of this invention, it is often preferred to employ a tertiary amine to catalyze or facilitate the progress of the reaction. Examples of tertiary amines which can be employed are triethylamine, dimethylaniline, pyridine and the like. It is also preferred to carry out the reaction in the presence of an inert organic solvent. Suitable solvents include benzene, toluene, xylene, the chlorinated benzenes, ethyl ether, propyl ether, tetrahydrofuran and the like.

The reaction temperatures employed in the preparation of the compounds of this invention will vary from room temperature to the reflux temperature of the reaction mixture. The specific temperature employed in any given case will be primarily dependent upon the particular reactants used to produce the desired carbamic acid ester. It should be noted that, although the presence of both a tertiary amine and an inert organic solvent is preferred, neither of these materials is essential to the preparation of the compounds described herein.

The invention will be more fully understood by reference to the following examples, which are set forth herein for the purpose of illustration only and are not to be construed as limiting the scope of this invention in any manner.

EXAMPLE 1

A suitable reaction vessel, equipped with a condenser, a stirrer, a thermometer and an additional funnel, is charged with a solution of 6.3 grams (0.11 mole) of methyl isocyanate in 50 ml. of monochlorobenzene. The solution is stirred and heated to about 50° C. There is then added, dropwise over a period of ½ hour, 17.8 grams (0.05 mole) of 2,2' - thiobis(4,6 - dichlorophenol) in 100 ml. of monochlorobenzene. The resultant mixture is heated to about 100° C., after which it is cooled and filtered. The filter cake is then washed with Skellylsolve B (an essentially n-hexane solvent having a boiling range of 60–70° C.) and dried. The product is recrystallized from acetone to yield 2,2'- thiobis(4,6 - dichlorophenyl) bis(methylcarbamate) as a white solid, M.P. 205° C. (decomp.). Analysis shows 30.0% chlorine and 6.7% sulfur as against calculated values of 30.2% and 6.8%, respectively, for $C_{16}H_{12}Cl_4N_2O_4S$.

EXAMPLE 2

Following the procedures set forth in Example 1, 7.8 grams of ethyl isocyanate and 29.3 grams of 2,2'-thiobis-(3,4-dibromophenol) are employed as the reactants. The product obtained is 2,2'-thiobis(3,4-dibromophenyl) bis-(ethylcarbamate).

EXAMPLE 3

Following the procedures set forth in Example 1, 20.7 grams of 2,4-dichlorophenyl isocyanate and 17.8 grams of 2,2'-thiobis(3,4-dichlorophenol) are employed as the reactants. The product obtained is 2,2'-thiobis(3,4-dichlorophenyl) bis(2,4-dichlorocarbanilate).

EXAMPLE 4

A reaction vessel, as described in Example 1, is charged with 7.1 grams (0.02 mole) of 2,2'-thiobis(4,6-dichlorophenol) in 100 ml. of dry toluene. The solution is heated to 75° C. while 2 ml. of triethylamine and 20 ml. of dry ether are added. There is then added, dropwise over a period of 15 minutes, 3.8 grams (0.02 mole) of 3,4-dichlorophenyl isocyanate in 50 ml. of dry toluene. The resultant mixture is stirred for 2 hours at room temperature, and 50 ml. of Skellysolve B is added to enhance crystallization. An ice-acetone bath is employed to complete precipitation. The product is recrystallized from Skellysolve B to yield 2,4-dichloro-6-(3,5 - dichloro - 2 - hydroxyphenylthio)phenyl 3,4-dichlorocarbanilate as a white powder, M.P. 199–203° C.

EXAMPLE 5

Following the procedures set forth in Example 4, 3.1 grams of m-chlorophenyl isocyanate and 8.5 grams of 2,2'-thiobis(3,4,6-trichlorophenol) are employed as the reactants. The product obtained is 2,4,5-trichloro-6-(2-hydroxy-3,5,6 - trichlorophenylthio)phenyl m - chlorocarbanilate.

EXAMPLE 6

A suitable reaction vessel, equipped with a condenser, a stirrer, a thermometer and an addition funnel, is charged with 8.9 grams (0.025 mole) of 2,2'-thiobis(4,6-dichlorophenol) in 250 ml. of benzene. The solution is held at room temperature during the addition of 6.5 grams (0.055 mole) of phenyl isocyanate and three drops of triethylamine. The resultant mixture is then heated at refluxing temperature for about 8 hours, after which the product is collected and washed with benzene. There is obtained 2,2'-thiobis(4,6-dichlorophenyl) dicarbanilate as white crystals, M.P. 208–210° C.

EXAMPLE 7

Following the procedures set forth in Example 6, 9.0 grams of p-chlorophenyl isocyanate is employed in place of the phenyl isocyanate. The product obtained is 2,2'-thiobis(4,6-dichlorophenyl) bis (p-chlorocarbanilate).

EXAMPLE 8

Following the procedures set forth in Example 6, 9.8 grams of 3,4-dichlorophenyl isocyanate is employed in place of the phenyl isocyanate. Upon recrystallization from acetonitrile, the product obtained is 2,2'-thiobis(4,6-dichlorophenyl) bis(3,4-dichlorocarbanilate).

EXAMPLE 9

Following the procedures set forth in Example 6, 7.1 grams of 2,2'-thiobis(p-chlorophenol) and 12.3 grams of 3,4,5-trichlorophenyl isocyanate are employed as the reactants. The product obtained is 2,2'-thiobis(p-chlorophenyl) bis(3,4,5-trichlorocarbanilate).

As stated above, the products of the present invention are useful as microbicides adapted to be employed for the control of bacterial and fungal organisms. In representative tests, 2,2'-thiobis(4,6-dichlorophenyl) bis(3,4-dichlorocarbanilate) is found to be effective against *Staphylococcus aureus* at a dilution in excess of one part per million. Said compound is further found to be effective against both *Aspergillus niger* and *Salmonella typhosa* at a dilution in excess of one part per one hundred thousand. Similar activity against such organisms is also displayed by 2,4-dichloro-6-(3,5-dichloro-2-hydroxyphenylthio)phenyl 3,4-dichlorocarbanilate.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula,

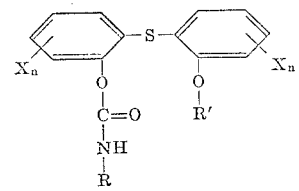

wherein R' is selected from the group consisting of hydrogen and

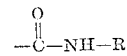

R is selected from the group consisting of lower alkyl, phenyl, chlorophenyl of from 1 to 3 chlorine atoms and bromophenyl of from 1 to 3 bromine atoms, X is selected from the group consisting of chlorine and bromine, and $n$ is an integer from 1 to 3.

2. A compound of the formula,

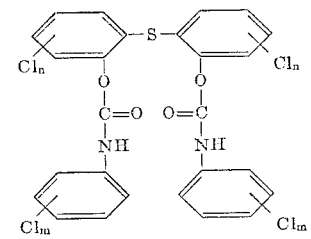

wherein $m$ and $n$ are each an integer from 1 to 3.

3. A compound of the formula,

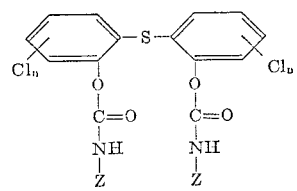

wherein $n$ is an integer from 1 to 3, and Z is lower alkyl.

4. A compound of the formula,

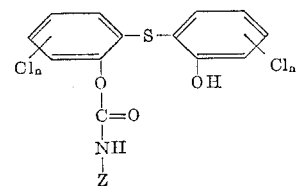

wherein $n$ is an integer from 1 to 3, and Z is lower alkyl.

5. 2,2' - thiobis(4,6 - dichlorophenyl) bis(methylcarbamate).

6. 2,2'-dichloro-6-(3,5-dichloro-2-hydroxyphenylthio) phenyl 3,4-dichlorocarbanilate.
7. 2,2'-thiobis(4,6-dichlorophenyl) dicarbanilate.
8. 2,2'-thiobis(4,6-dichlorophenyl) bis(p-chlorocarbanilate).
9. 2,2'-thiobis(4,6-dichlorophenyl) bis(3,4-dichlorocarbanilate).

References Cited

Gump et al.: Chemical Abstracts, vol. 55, pp. 17740g–17741b relied on.

LORRAINE A. WEINBERGER, *Primary Examiner.*

L. A. THAXTON, *Assistant Examiner.*